US010616890B2

(12) United States Patent
Frederiksen et al.

(10) Patent No.: US 10,616,890 B2
(45) Date of Patent: Apr. 7, 2020

(54) COMMUNICATIONS IN WIRELESS SYSTEMS

(71) Applicant: Nokia Solutions and Networks Oy, Espoo (FI)

(72) Inventors: Frank Frederiksen, Aalborg (DK); Mads Lauridsen, Aalborg (DK); Fernando Tavares, Aalborg (DK); Gilberto Berardinelli, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/126,694

(22) PCT Filed: Mar. 31, 2014

(86) PCT No.: PCT/EP2014/056446
§ 371 (c)(1),
(2) Date: Sep. 16, 2016

(87) PCT Pub. No.: WO2015/149837
PCT Pub. Date: Oct. 8, 2015

(65) Prior Publication Data
US 2017/0094660 A1    Mar. 30, 2017

(51) Int. Cl.
*H04W 52/02* (2009.01)
*H04W 72/04* (2009.01)
(Continued)

(52) U.S. Cl.
CPC ..... *H04W 72/0453* (2013.01); *H04W 52/028* (2013.01); *H04W 52/0216* (2013.01);
(Continued)

(58) Field of Classification Search
CPC ......... H04W 72/0453; H04W 52/0216; H04W 52/0229; H04W 52/028; H04W 72/12
See application file for complete search history.

(56) References Cited

U.S. PATENT DOCUMENTS

2001/0041551 A1    11/2001  Rotzoll
2010/0272037 A1    10/2010  Lee et al.
(Continued)

FOREIGN PATENT DOCUMENTS

EP    2 595 425 A1    5/2013
JP    2003-249908 A    9/2003
(Continued)

OTHER PUBLICATIONS

International Search Report and Written Opinion received for corresponding Patent Cooperation Treaty Application No. PCT/EP2014/056446, dated Dec. 5, 2014, 13 pages.
(Continued)

*Primary Examiner* — Said M Elnoubi
(74) *Attorney, Agent, or Firm* — Squire Patton Boggs (US) LLP (57) ABSTRACT

Methods and apparatuses for controlling at least one device configured to receive scheduled frequency resources of a scheduled system are disclosed. At least one device in inactive mode is allocated a secondary frequency resource independently from scheduling of the scheduled system. A signal is transmitted to the at least one device in inactive mode a signal on the secondary frequency resource to control reception of the scheduled frequency resources. A device in inactive mode receiving the signal on the secondary frequency resource can control reception of the scheduled frequency resources based on the signal.

20 Claims, 5 Drawing Sheets

(51) Int. Cl.
*H04W 72/12* (2009.01)
*H04W 88/06* (2009.01)

(52) U.S. Cl.
CPC ....... *H04W 52/0229* (2013.01); *H04W 72/12* (2013.01); *H04W 88/06* (2013.01); *Y02D 70/00* (2018.01); *Y02D 70/1242* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/22* (2018.01); *Y02D 70/24* (2018.01); *Y02D 70/26* (2018.01)

(56) References Cited

U.S. PATENT DOCUMENTS

| | | | | |
|---|---|---|---|---|
| 2012/0122495 | A1* | 5/2012 | Weng | H04W 68/025 455/458 |
| 2013/0028069 | A1 | 1/2013 | Pelletier | |
| 2014/0023006 | A1* | 1/2014 | Jeong | H04W 72/0446 370/329 |

FOREIGN PATENT DOCUMENTS

| | | | | |
|---|---|---|---|---|
| JP | 2005-245035 | A | 9/2005 | |
| JP | 2009-531891 | A | 9/2009 | |
| JP | 2012-530405 | A | 11/2012 | |
| JP | 2013-520935 | A | 6/2013 | |
| JP | 2013-527683 | A | 6/2013 | |
| WO | WO 2013/072222 | A1 | 5/2013 | |
| WO | WO-2013072222 | A1 * | 5/2013 | ........ H04W 52/0216 |

OTHER PUBLICATIONS

Notice of Reasons for Rejection dated Nov. 13, 2017 corresponding to Japanese Patent Application No. 2016-559438, and partial English translation thereof.
European Office Action dated Nov. 2, 2017, issued in corresponding EP Application No. 14 715 880.2.
European Office Action issued in corresponding European Patent Application No. 14 715 880.2 dated Jun. 28, 2018.
Japanese Office Action and it's English language translation dated Aug. 7, 2018, issued in corresponding JP Application No. 2016-559438.
European Office Action cited in corresponding European Patent Application No. 14 715 880.2-1215 dated Jul. 10, 2019.
Notice of Reasons for Rejection dated Aug. 6, 2019 corresponding to Japanese Patent Application No. 2018-222571 and English translation thereof.
Indonesian Office Action issued in corresponding Indonesian Patent Application No. P00 2016 07137 dated Sep. 12, 2019.

* cited by examiner

COMMUNICATIONS IN WIRELESS SYSTEMS

RELATED APPLICATION

This application was originally filed as Patent Cooperation Treaty Application No. PCT/EP2014/056446 filed Mar. 31, 2014.

This disclosure relates to communications in wireless communication systems and more particularly transmissions in wireless communication system configured for scheduled transmissions.

A communication system can be seen as a facility that enables communications between two or more nodes such as fixed or mobile communication devices, access points such as base stations, servers, machine type devices and so on. A communication system and compatible communicating entities typically operate in accordance with a given standard or specification which sets out what the various entities associated with the system are permitted to do and how that should be achieved. For example, the standards, specifications and related protocols can define the manner how communications between communication devices and the access points shall be arranged, how various aspects of the communications shall be provided and how the equipment shall be configured.

Signals can be carried on wired or wireless carriers. Examples of wireless systems include public land mobile networks (PLMN) such as cellular networks, satellite based communication systems and different wireless local networks, for example wireless local area networks (WLAN). Wireless systems can be divided into coverage areas referred to as cells, and hence the wireless systems are often referred to as cellular systems. A base station can provide one or more cells, there being various different types of base stations and cells.

A user can access the communication system by means of an appropriate communication device or terminal. Typically a communication device is used for enabling receiving and transmission of communications such as speech and data. A communication device is typically provided with an appropriate signal receiving and transmitting arrangement for enabling communications with other parties. The communication device may access a carrier provided by a base station, and transmit and/or receive communications on the carrier.

Transmission towards receiving devices can be based on scheduling. In scheduled wireless systems periodic paging techniques are frequently used to save energy at the recipient device. The recipient device only needs to be active for a short time during each period while it can go inactive for the rest of the time. Two commonly used mechanisms for this purpose are idle mode and sleep mode. During active periods, the recipient device checks for incoming paging messages from the network. This principle of being able to switch between active and inactive states will allow for the recipient device to save power while still being available to the network in case of network originated traffic, for example in case of an incoming telephone call.

Modern networks have typically two levels of "paging". A "normal" paging procedure is where the recipient communication device is not connected in active mode but rather in idle mode. In light-weight paging mode a communication device is in connected mode while in discontinuous reception mode where it is periodically listening for scheduling grants.

However, the periodicity in paging can be problematic in certain respects. For example, if incoming traffic is not periodic, periodic paging can lead to delayed packets, in particular if the period is too long. In general, the average packet delay for random incoming traffic instants will correspond to half the time between paging instants. Energy can be wasted at the recipient communication device if the device is in active mode but does not receive paging messages, in particular if the period is too short.

It is noted that the above discussed issues are not limited to any particular communication environment and station apparatus but may occur in any appropriate system.

Embodiments of the invention aim to address one or several of the above issues.

In accordance with an embodiment there is provided a method for controlling at least one device configured to receive scheduled frequency resources of a scheduled system, the method comprising allocating, to at least one device in inactive mode, a secondary frequency resource independently from scheduling of the scheduled system, and transmitting to the at least one device in inactive mode a signal on the secondary frequency resource to control reception of the scheduled frequency resources.

In accordance with an embodiment there is provided a method for controlling a device configured to receive scheduled frequency resources of a scheduled system, comprising receiving, when the device is in inactive mode, a signal on a secondary frequency resource independently from scheduling of the scheduled system, and controlling reception of the scheduled frequency resources based on the signal.

In accordance with an embodiment there is provided an apparatus for controlling in a scheduled system at least one device configured to receive scheduled frequency resources, the apparatus comprising at least one processor, and at least one memory including computer program code, wherein the at least one memory and the computer program code are configured, with the at least one processor, to cause allocation, to at least one device in inactive mode, of a secondary frequency resource independently from scheduling of the scheduled system, and transmission of a signal to the at least one device in inactive mode on the secondary frequency resource to control reception of the scheduled frequency resources.

In accordance with an embodiment there is provided an apparatus for a device configured to receive scheduled frequency resources of a scheduled system, receive, when the device is in inactive mode, a signal on a secondary frequency resource independently from scheduling of the scheduled system, and control reception of the scheduled frequency resources based on the signal.

In accordance with a more specific embodiment a first receiver function operating with a wider bandwidth or based on a different radio access technology than a second receiver function configured to receive the secondary frequency resource is controlled based on the signal when the first receiver function is in inactive mode.

The scheduled frequency resources may comprise at least one unit of resource, the unit of resource comprising a first frequency resource and the secondary frequency resource may comprise a second frequency resource that is smaller than the first frequency resource in one unit of resource. The resource unit can comprise a physical resource block of an orthogonal frequency division multiplexing (OFDM) system.

Information about the secondary resource may be communicated. Said information can be transmitted in a system information message or via dedicated signalling. The information can comprise at least one of user equipment identification and paging information.

The secondary frequency resources may comprise at least one sub-carrier of an orthogonal frequency division multiplexing (OFDM) system. The secondary frequency resource may at least in part be included in a scheduled frequency resource. The secondary resource may comprise a direct current sub-carrier of an OFDM system.

A signal to be transmitted on the scheduled resource may be muted and replaced with the secondary signal.

At least one of encoding and rate matching of data to be transmitted on the scheduled resource may be provided based on information about secondary resource. The signal may be modulated by a binary sequence. The binary sequence can be one of a plurality of binary sequences. One or more of the plurality of binary sequences can be reserved as a means for communicating information associated with the secondary resource.

The signal on the secondary frequency resource can comprise a signal for waking up a function for receiving the scheduled resources.

A computer program comprising program code means adapted to perform the herein described methods may also be provided. In accordance with further embodiments apparatus and/or computer program product that can be embodied on a computer readable medium for providing at least one of the above methods is provided.

A network node such as a base station or a controller entity for controlling transmissions in an area or otherwise controlling operation in an area can be configured to operate in accordance with at least some of the embodiments. A communication system embodying the apparatus and principles of the invention may also be provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication system serving mobile communication devices. Before explaining in detail the exemplifying embodiments, certain general principles of a wireless communication system, access systems thereof, and mobile communication devices are briefly explained with reference to FIGS. 1 to 3 to assist in understanding the technology underlying the described examples.

A non-limiting example of the recent developments in communication system architectures is the long-term evolution (LTE) of the Universal Mobile Telecommunications System (UMTS) that is being standardized by the 3rd Generation Partnership Project (3GPP). The LTE employs a mobile architecture known as the Evolved Universal Terrestrial Radio Access Network (E-UTRAN). Base stations of such systems are known as evolved or enhanced Node Bs (eNodeBs; eNBs) and may provide E-UTRAN features such as user plane Radio Link Control/Medium Access Control/Physical layer protocol (RLC/MAC/PHY) and control plane Radio Resource Control (RRC) protocol terminations towards communication devices. Other examples of radio access system include those provided by base stations of systems that are based on technologies such as wireless local area network (WLAN) and/or WiMax (Worldwide Interoperability for Microwave Access).

Figure 1:
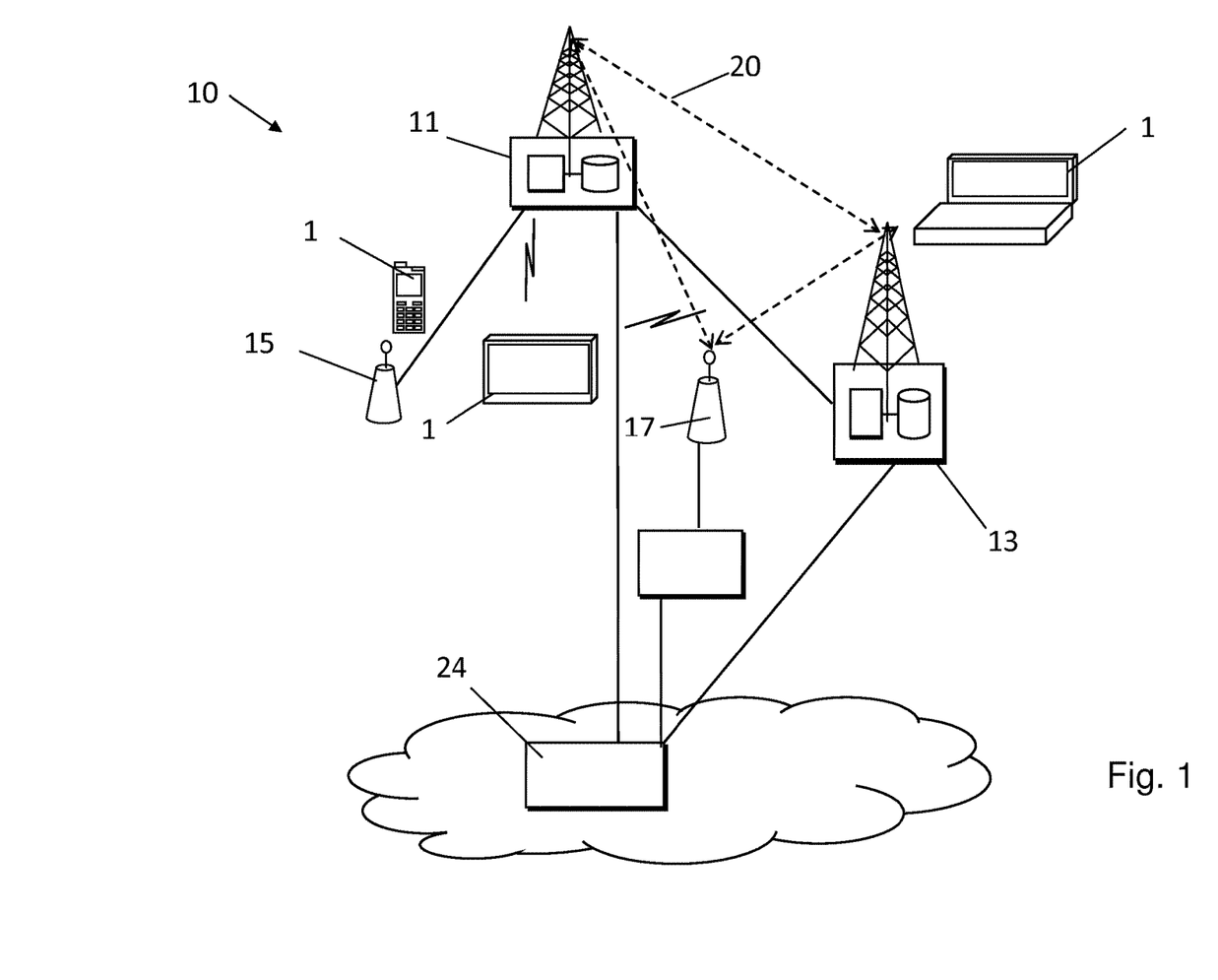
FIG. 1 shows a schematic diagram of a cellular system where certain embodiments can be implemented.

Communication devices or terminals 1 can be provided wireless access via base stations or similar wireless transmitter and/or receiver nodes providing radio service areas or cells. FIG. 1 shows four base stations 11, 13, 15 and 17, but it is noted that these are shown only for illustration purposes and that a larger or smaller number of base stations sites may be provided. A base station site can provide one or more cells or sectors. A sector may provide a cell or a subarea of a cell. Thus it shall be appreciated that the number, size and shape of cells may vary considerably.

Base stations and hence communications in cells are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. For example, in LTE a given eNB typically controls several cells.

Different types of possible cells include those known as macro cells, pico cells and femto cells. For example, transmission/reception points or base stations can comprise wide area network nodes such as a macro eNode B (eNB) which may, for example, provide coverage for an entire cell or similar radio service area. Base station can also be provided by small or local radio service area network nodes, for example Home eNBs (HeNB), pico eNodeBs (pico-eNB), or femto nodes. Some applications utilise radio remote heads (RRH; denoted by 15 in the example) that are connected to for example an eNB (denoted by 11 in the example).

Base stations and associated controllers may communicate via each other via fixed line connection and/or air interface. The logical connection between the base station nodes can be provided for example by an X2 interface. In FIG. 1 this interface is shown by the dashed line denoted by 20.

Figure 2:
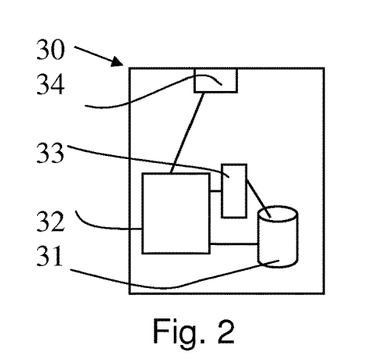
FIG. 2 shows a schematic diagram of a control apparatus according to some embodiments.

FIG. 2 shows an example of a control apparatus for a node, for example to be integrated with, coupled to and/or otherwise for controlling any of the base stations. The control apparatus 30 can be arranged to provide control on communications in the service area of a base station site. The control apparatus 30 can be configured to provide control functions in association with allocation of scheduled transmissions. The control apparatus can also be configured for allocation of secondary resources in accordance with certain embodiments described below. For this purpose the control apparatus comprises at least one memory 31, at least one data processing unit 32, 33 and an input/output interface 34. Via the interface the control apparatus can be coupled to at least one receiver and at least one transmitter of the base station. The control apparatus can be configured to execute an appropriate software code to provide the control functions. It shall be appreciated that similar components can be provided in a control apparatus provided elsewhere in the system, for example in entity 24 of FIG. 1.

The communication devices 1 may comprise any suitable device capable of at least receiving wireless communication of data. For example, the terminals can be handheld data processing devices equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, ear pieces with wireless connectivity, jewellery and so on, universal serial bus (USB) sticks with wireless capabilities, modem data cards or any combinations of these or the like. Communication devices of users are often referred to as user equipment (UE).

Figure 3:
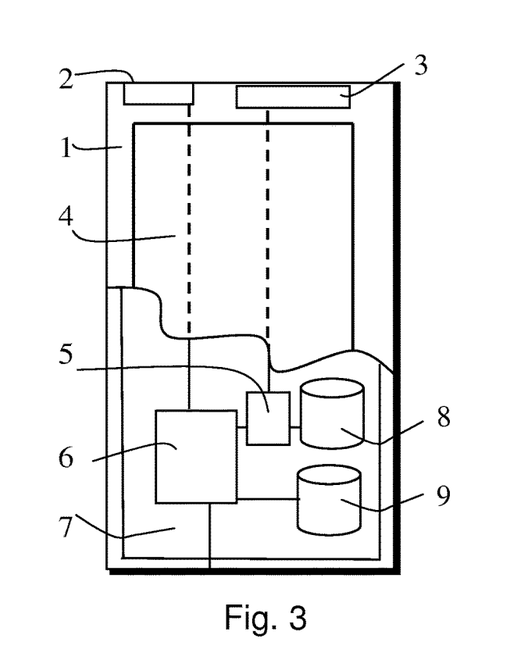
FIG. 3 shows a schematic presentation of a possible communication device with two receivers.

FIG. 3 shows a schematic, partially sectioned view of a possible communication device. More particularly, a handheld or otherwise mobile communication device 1 is shown. A mobile communication device is provided with wireless communication capabilities and appropriate electronic control apparatus for enabling operation thereof in accordance with the herein described principles. Thus the mobile device 1 is shown being provided with at least one data processing entity 6, for example a central processing unit and/or a core processor, at least one memory 8 and other possible components such as additional processors 5 and memories 9 for use in software and hardware aided execution of tasks it is designed to perform. The data processing, storage and other relevant control apparatus can be provided on an appropriate circuit board 7 and/or in chipsets. Data processing and memory functions provided by the control apparatus of the mobile device are configured to cause control and signalling operations in accordance with certain embodiments of the present invention as described later in this description. A user may control the operation of the mobile device by means of a suitable user interface such as touch sensitive display screen or pad 4 and/or a key pad, actuator buttons, voice commands, combinations of these or the like. A speaker and a microphone are also typically provided. Furthermore, a mobile communication device may comprise appropriate connectors (either wired or wireless) to other devices and/or for connecting external accessories, for example hands-free equipment, thereto.

The mobile device may communicate wirelessly with other devices via appropriate apparatus for receiving and transmitting signals. In some embodiments at least two different types of receiver apparatus can be provided. Thus FIG. 3 shows schematically two radio blocks 2 and 3 connected to the control apparatus of the device. The radio blocks can comprise a radio part and associated antenna arrangement. The antenna arrangement may be arranged internally or externally to the mobile device and can be shared by radio apparatuses 2 and 3. In accordance with an embodiment apparatus 2 provides a main transceiver and apparatus 3 provides a secondary receiver of the mobile device 1.

In view of the main and secondary receiver functionalities it is noted that these can also be provided by one receiver apparatus. Thus, instead of the two physically separate receivers of FIG. 3, only one receiver apparatus can be provided, the receiver apparatus being arranged to receive the scheduled transmissions and secondary transmissions.

A secondary channel can be provided for reception by the secondary channel receiver of the communication device. In the following examples are described in relation to an event based paging mechanism which can act either as stand-alone or in conjunction with the regular paging principles.

In accordance with a more specific embodiment a pre-paging message regarding an actual paging message is transmitted to and received by a secondary receiver function of the receiving device with a main receiver function in inactive state. The secondary receiver function then informs the main transceiver function of the incoming actual paging message. Thus the main receiver function can be activated in response to the pre-paging message and is able to receive the actual paging message.

Figure 4:
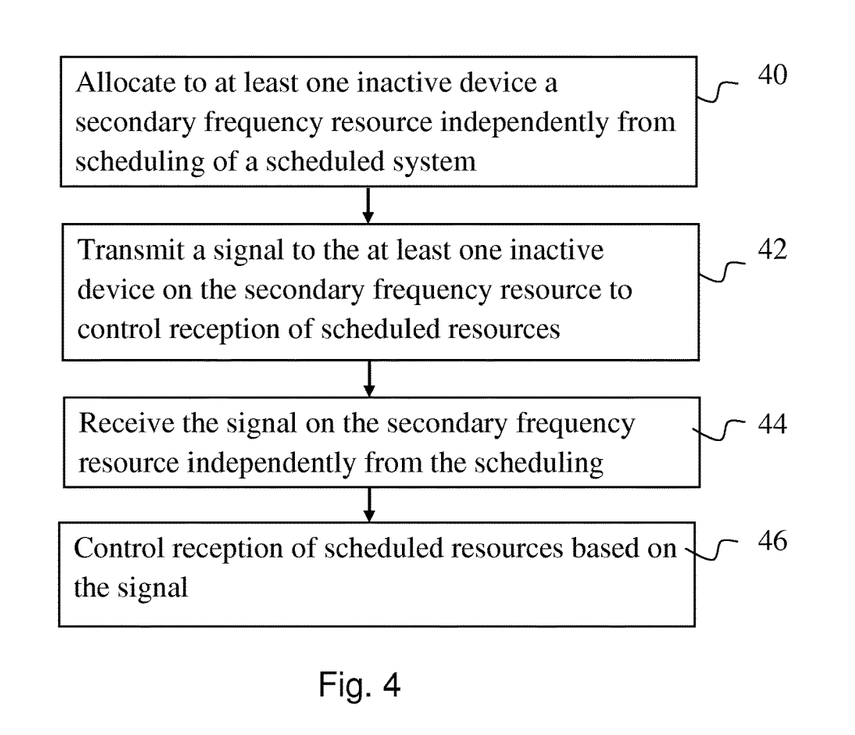
FIG. 4 is a flowchart according to certain embodiments.

The flowchart of FIG. 4 illustrates an example of use of the secondary channel in a communication system where transmissions, for example by a base station to communication devices within its service area, are scheduled in accordance with a predefined scheduling algorithm for controlling at least one device configured to receive scheduled frequency resources of the scheduled system. In the method a secondary frequency resource is allocated at 40 independently from the predefined scheduling of the scheduled system to at least one device in inactive mode. A signal is then transmitted at 42 on the secondary frequency resource to the at least one device in inactive mode to control reception of the scheduled frequency resources.

FIG. 4 further shows steps 44 and 46 taking place in an inactive communication device. At 44 the device receives a signal on the secondary frequency resource independently from scheduling of the scheduled system. Reception of the scheduled frequency resources can then be controlled at 46 based on the signal communicated on the secondary resource.

According to one embodiment the signal can be used to control a first receiver function operating with a wider bandwidth than a second receiver function configured to receive the secondary frequency resource when the first receiver function is in inactive mode. According to another embodiment the signal is communicated based on a different radio access technology.

The signal is received by a secondary channel receiver function of the device that is in a mode where the receiver function of the scheduled frequency resource is not active. The receiver functions can be provided by a single physical receiver apparatus or by separate receivers.

The scheduled frequency resources may comprise at least one unit of resource, the unit of resource comprising a first frequency resource. The secondary frequency resource may comprise a second frequency resource that is smaller than the first frequency resource in one unit of resource. The size is predefined, and typically is the smallest number of frequency resources that can be scheduled for transmission in the given scheduled system. For example, the resource unit can be a physical resource block (PRB) of an orthogonal frequency division multiplexing (OFDM) system, and the second frequency resource can comprise a portion of the OFDM PRB.

The at least one device in inactive mode may be provided with information about the secondary resource. Such information may be transmitted e.g. in a system information (SI) message. According to a possibility, this configuration is communicated to the device through dedicated signalling, for example by means of radio resource control (RRC) signalling.

In accordance with an embodiment reception of the signal at 44 by the receiver function of the secondary resource triggers sending of an internal interrupt signal to the main receiver function. In response to the internal signal triggered by reception of the signal on the secondary resource reception of the scheduled resource is activated and thus incoming data can be received. This data may comprise a regular paging message, or any other data.

In connected mode a communication device is aware of the timing of the system. However, when a communication device is in inactive mode and only scanning for a possible secondary signal such as wake-up signal the device may not be aware of the timing of the system.

In accordance with an embodiment a first or main receiver operates with a wider bandwidth than the secondary receiver, making the first receiver more complex. Use of wide bandwidths requires for example a more precise and more power consuming clock and also a higher sampling rate. Use of wide bandwidths may also increase the power consumption of other RF components. Thus, in accordance with an embodiment a narrowband signal is introduced in a scheduled wireless system for detection and use by a low-power secondary receiver. Use of a narrowband signal can be advantageous because it entails low-power components which can be used in conjunction with a low sample rate in the secondary receiver.

The narrowband transmission can be implemented using an in-band transmission scheme requiring no additional transmitter.

Figure 5:
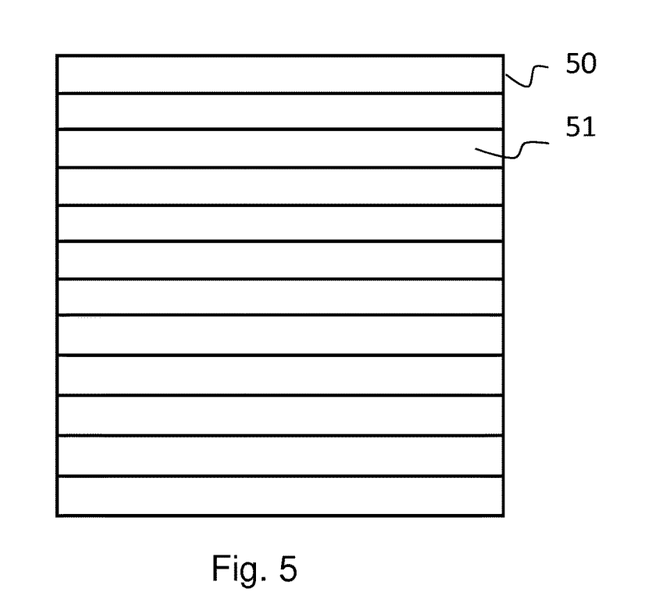
FIG. 5 shows an example of a unit of resource.

One possible use scenario relates to an orthogonal frequency division multiplexing (OFDM) based air interface (as used, for instance, in LTE and LTE-A, and would be applicable to future systems also using OFDM for access), and discloses a method for implementing the secondary resource in a subset of the OFDM resources. An OFDM channel can be divided into multiple Physical Resource Blocks (PRBs). Each PRB consists of a number of subcarriers spanning certain time duration. For example, in LTE, a PRB spans twelve subcarriers and contains fourteen OFDM symbols within a transmit time interval of 1 ms (for normal cyclic prefix operation). Usually subcarriers of OFDM system are grouped together during a certain time period to comprise a set of resources, which can be allocated to the user. The PRB comprises a predefined number of subcarriers (e.g. twelve, meaning 180 kHz of total bandwidth) during one transmission time interval (TTI). An example of a PRB 50 with twelve subcarriers 51 is illustrated in FIG. 5. It shall be appreciated that this is only an example, and e.g. for the $5^{th}$ Generation (5G) concepts larger PRBs in the order of ten MHz have been proposed.

When the concept of a secondary receiver that is adapted to receive signals that are not scheduled in accordance with the scheduling of a scheduled wireless system is adapted to the scheduled wireless system the secondary channel signal can be allocated within the bandwidth of the transmitting site along with the regular data and control channels. If a whole PRB is allocated to a secondary signal, e.g. a wake-up or other interruption signal, this can impact the system capacity and/or hardware complexity. Thus, only a small subset of the subcarriers is used and dedicated to the secondary channel. The number of subcarriers within a system bandwidth is usually high and therefore addition of these subsets is expected to lead only to minor throughput degradation, in particular if only a limited part of the subsets is dedicated to such a secondary channel. However, in accordance with the existing LTE standards the minimum resource that can be allocated is the PRB (i.e. twelve sub-carriers). Thus changes in the standard in this regard may be needed.

Instead of using the same access technology and in-band secondary signals another radio access technology (RAT) can also be used to provide an out-of-band secondary signal. Thus e.g. a wake-up signal can be transmitted and received using another RAT that can be based on a standard tailored for low power consumption in order to control a receiver function of the scheduled resources of the scheduled system. In accordance with one scenario a scheduled cellular system is complemented by a non-cellular system to provide the secondary signal. Examples for RATs for communicating the secondary signal include various short range radio systems, wireless local area networks (WLAN) and remote control systems. Particular commercially available examples of such systems include Bluetooth™, Wifi™, Zig-Bee™, and Z-Wave™. In the FIG. 1 example, the signal may be transmitted to the mobile device 1 on a secondary resource provided by base station 17. The scheduled resources can be transmitted by base station 11 of the cellular system.

The first receiver and/or operation of the device can be controlled based on the signal received by the secondary receiver.

Figure 6:
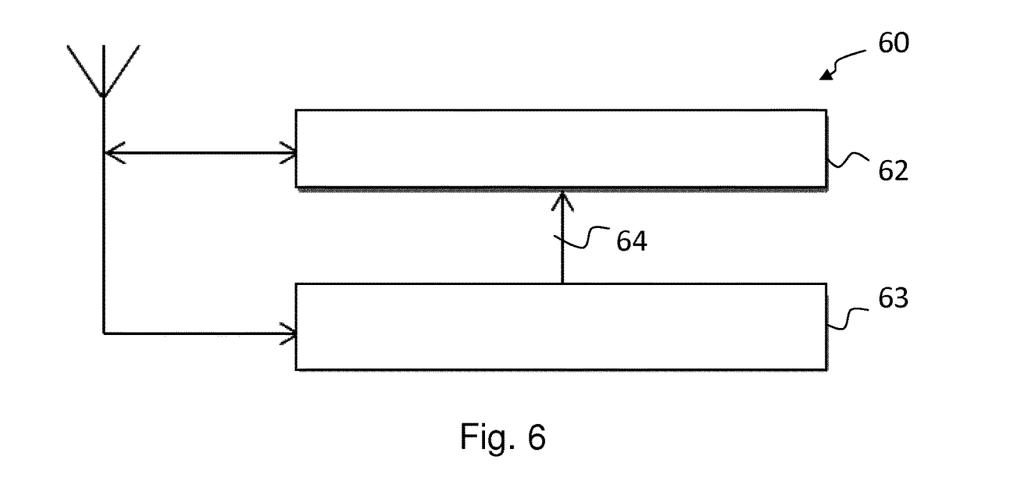
FIG. 6 shows an example of a two receiver apparatus.

An example of a receiver arrangement 60 comprising a first or main receiver 62 and a secondary channel receiver 63 is shown in FIG. 6. A secondary channel can be received for example by a tuneable narrowband filter or by mixing to an intermediate frequency where a fixed narrowband filter is applicable. A transmitter of the secondary channel may rely on using on-off-keying which basically modulates the signal by turning the carrier wave on and off according to a predefined binary sequence having good cross-correlation properties (e.g., Gold sequences). By detecting the carrier wave state using an envelope detector a bit pattern can be received and correlated with the receiver's own sequence (ID). By using multiple parallel correlators, each applying the sequence shifted one bit, need for synchronization to the bit sequence can be avoided hence there is no need for a power consuming radio frequency (RF) local oscillation (LO).

Figure 7:
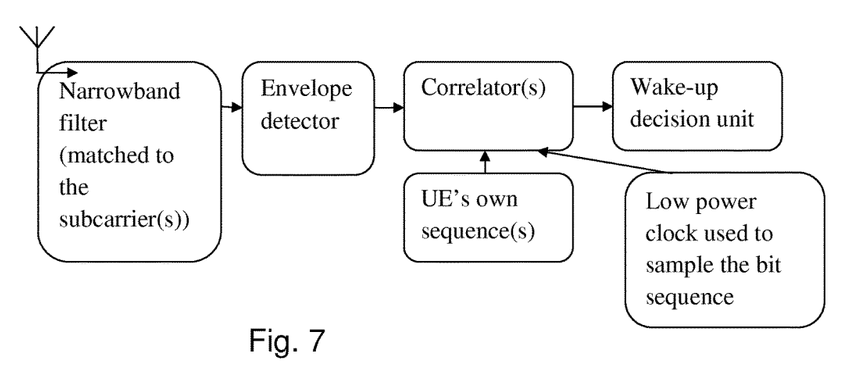
FIG. 7 shows an exemplifying block diagram for receiver apparatus.

FIG. 7 shows an example of such an implementation. The robustness towards interference can be achieved by exploiting autocorrelation and cross-correlation properties of the selected binary sequences.

According to an illustrative example one subcarrier according to 3GPP LTE standard release 8 is used. Such subcarrier spans 15 kHz in the frequency domain and 14 symbols in the time domain. Including overhead this covers 1 ms. If the sequence is implemented using one LTE symbol per bit it requires a clock frequency input to the correlator equal to the symbol frequency (15 kHz). This should entail low power consumption and still lead to a sequence with $2^{14}$ possible signalling states. Some of the states can be reserved for "coding robustness" while the remaining part can be used for providing some unique identity information (IDs). Another example is to use the same frequency resource in successive TTIs. This allows for more symbols to improve the robustness or the number of IDs.

A base station can inform a communication device about the identity (ID) it has been assigned, and the recipient communication device can then switch off its primary receiver and enable the secondary receiver. Furthermore, the device and the base station may need to agree on the subcarrier that is used for the signal to be received by the secondary receiver. This may be provided by using regular control signalling/configuration mechanisms.

A more specific example of use of a secondary resource in a scheduled system is now given in relation to a concept of wake-up receivers (WuRx) and FIGS. 6 and 7. In this concept a master node, or access point (AP), can wake up a specific sensor node whenever needed, thus providing event based reception triggering. A secondary low-power receiver 63 (wake-up receiver) can be used which is able to detect a specific wake-up signal transmitted by the master node. An internal signal 64 from the secondary receiver 63 to a main receiver 62 can comprise an internal signal to wake the main receiver up. In response to the interrupt signal 64 the main transceiver 62 will then power on to be able to receive data. Low power consumption can be achieved because the main transceiver 62 can be completely powered off while the wake-up receiver 63 is scanning for a paging signal.

Figure 8:
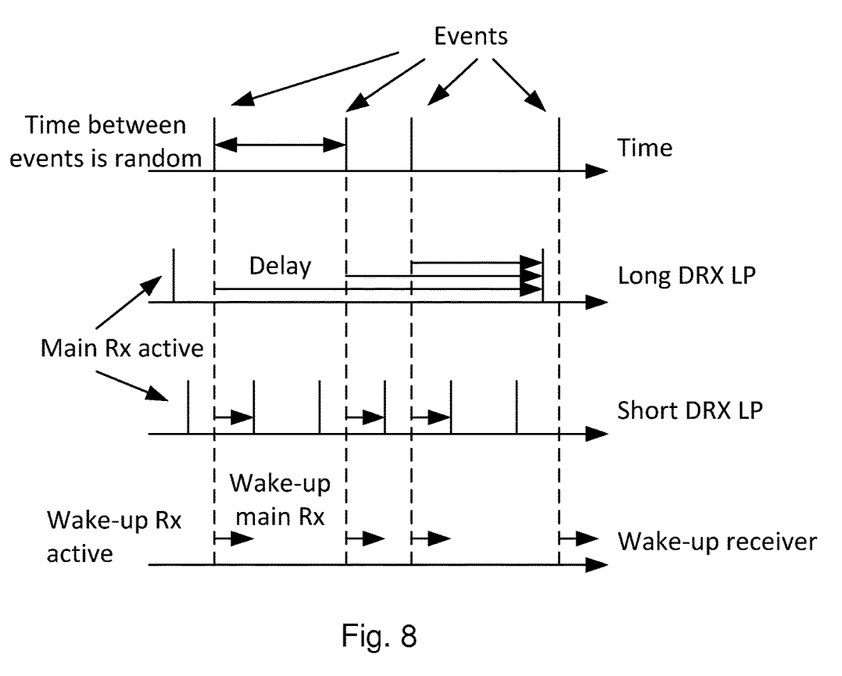
FIG. 8 is a comparison between DRX and event based reception.

FIG. 8 illustrates a comparison between short/long periodic discontinuous reception (DRX) and event-based reception, and more particularly reception of an event based wake-up signal.

Re-use of a whole PRB is likely to degrade cell capacity because of allocation of an entire PRB for a wake-up signal or other secondary signal to be transmitted. Also, complexity and power consumption of a secondary receiver such as a wake-up receiver (WuRx) hardware (HW) can increase considerably with increasing bandwidth.

The wake-up signal is an additional independent signal added on top of the existing signal structure. In accordance with one possible implementation a subset of the existing signal would be muted to allow room for the new signal. The muting can be arranged such that all receiving devices are aware of it. A possibility is that only inactive devices are aware of the muting.

In case of all potential recipient devices being made aware of the muting, one in-band carrier can be pre-reserved for this purpose. For example, both user equipment (UE) and eNB can be made aware that some resources are missing. The eNB and UE can then tune their rate matching to take into account the capacity gap due to the reservation of the aforementioned resources to the wake-up channel—or wake-up channels in case multiple UEs use different wake-up channels. This avoids loss of data bits which would be replaced by the wake-up channel. This option may cause increased signalling, as all UEs connected to the system would need to know the location of the wake-up channel(s). In accordance with a possibility the wake-up signal location is included in the system information (SI).

In the case of only inactive devices being aware of the muting, there could be some missing resources on the physical level, so the eNB or other access system controller may have to use less aggressive link adaptation to compensate for the lower performance in the decoding by the receiving devices.

The secondary resource can comprise a non-scheduled resource. The secondary signal can be defined as a non-scheduled resource because the scheduler of the transmitter does not accommodate for this signal at all. A non-scheduled resource can be included at least in part in a scheduled resource. For example, a physical resource block has been allocated to at least one connected device, i.e. the resource is scheduled for transmission, and the same physical resource, and more particularly a sub-carrier of the physical resource block, is allocated for transmitting a wake up signal to inactive devices.

Figure 9:
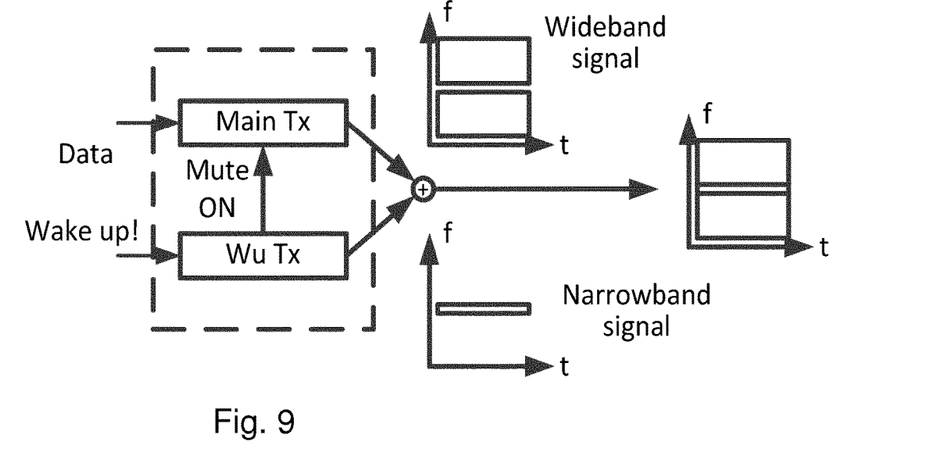
FIGS. 9 and 10 illustrate difference between scenarios where only a scheduled signal is generated for transmission and where scheduled and secondary signals are combined for transmission.
Figure 10:
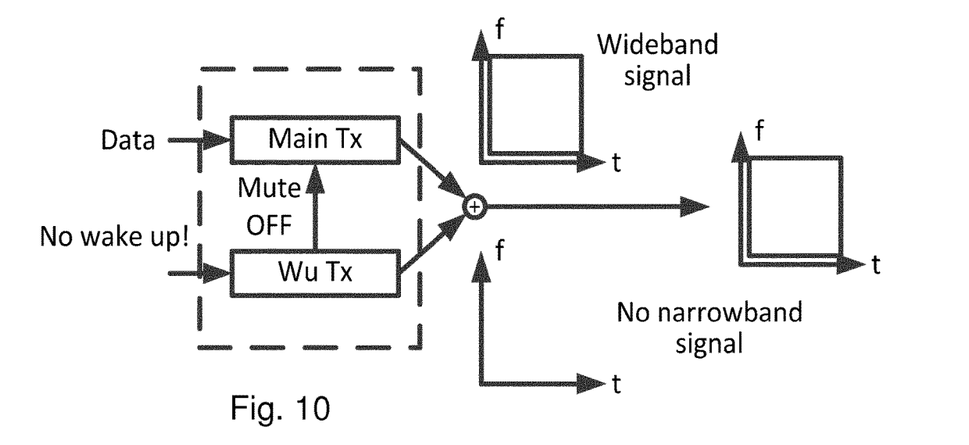

FIGS. 9 and 10 are logical representations of how a limited number of subcarriers may be muted in the main transceiver when a wake-up signal is present (FIG. 10) and where otherwise a full wideband signal is used for regular data (FIG. 9). In the logical representations the transmitter is shown to be composed of two individual logical transmitters but it shall be appreciated that in a physical implementation the two transmitter functions can be built into a single physical transmitter, as denoted by the dashed line.

A main transmitter function allocates the data and control channels in the standardized way and has the functionality to mute specific subcarrier(s). A wake-up transmitter function generates the narrowband wake-up signal and informs the main transmitter when to mute the selected subcarrier(s).

The wake-up signal can be transmitted in a time-multiplexed fashion such that the wake-up signal is only transmitted in a dedicated carrier in selected transmission time intervals (TTIs). That is, the wake-up signal can be only transmitted when it is needed, e.g. in response to a specific event.

The wake-up channel can for example be implemented by muting a predefined subcarrier, and then only modulate the subcarrier when the access point (AP) needs to send a wake-up signal. An advantage of this approach is that it can easily be implemented in the transmitter, and the cost in terms of throughput degradation can be low.

A possible implementation is to use a direct current (DC) subcarrier of an OFDM signal. If a secondary transceiver is used for a wake-up channel or similar, the DC subcarrier can be based on mixing with a slightly offset local oscillator (LO) frequency where after the signal then is added to the main antenna(s) before transmission. When the wake-up receiver receives the signal it also mixes with the offset LO and is hence able to demodulate the signal. This solution may need an extra transmitter and possibly also a better DC filter in the main receiver, because the wake-up channel can be perceived as noise. On the other hand the effect on throughput should be limited since the DC subcarrier is generally not used for data transmission. According to a possibility the wake-up receiver comprises a tuneable narrowband filter and thus avoids the mixing procedure.

In accordance with a possibility the secondary signal may be a periodic signal, e.g. a discontinuous reception (DRX) type signal, with different transmission periods and aiming to be received at the secondary receiver.

It is noted that whilst embodiments have been described in relation to LTE, similar principles can be applied to any other communication system where scheduled resources are allocated for transmissions or indeed to further developments with LTE. Also, instead of wake-up signals any other signal for inactive devices that can benefit from non-scheduled communication on a secondary channel may be provided. Instead of carriers provided by base stations at least one of the carriers may be provided by a mobile communication device. For example, this may be the case in application where no fixed equipment provided but a communication system is provided by means of a plurality of mobile equipment, for example in adhoc networks or other mobile stations that can act as a base or relay station and/or communicate directly with each other. Therefore, although certain embodiments were described above by way of example with reference to certain exemplifying architectures for wireless networks, technologies and standards, embodiments may be applied to any other suitable forms of communication systems than those illustrated and described herein.

The required data processing apparatus and functions of a base station apparatus, a communication device and any other appropriate apparatus may be provided by means of one or more data processors. The described functions at each end may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the spirit and scope of this invention as defined in the appended claims. Indeed there is a further embodiment comprising a combination of one or more of any of the other embodiments previously discussed.

The invention claimed is:

1. A method, comprising:
allocating, to at least one device in inactive mode, a secondary frequency resource independently from scheduling of a scheduled system;
transmitting, to the at least one device in inactive mode, a wake-up signal on the secondary frequency resource to control reception of scheduled frequency resources; and
transmitting an information about the secondary frequency resource in a system information message or via a dedicated signaling,
wherein the wake-up signal is transmitted in a dedicated carrier of the secondary frequency resource in selected transmission time intervals,
wherein the scheduled frequency resources comprise at least one unit of resource, the unit of resource comprising a first frequency resource, and
wherein the wake-up signal activates the at least one device in inactive mode.

2. A method according to claim 1, comprising controlling, based on the wake-up signal, a receiver function operating with a wider bandwidth or based on a different radio access technology than a secondary receiver function configured to receive the secondary frequency resource, when the receiver function is in inactive mode.

3. A method according to claim 1, wherein the secondary frequency resource comprises a second frequency resource that is smaller than the first frequency resource in one unit of resource.

4. A method according to claim 1,
wherein in the inactive mode, a receiver function configured to receive scheduled frequency resources is inactive, and a secondary receiver function configured to receive the secondary frequency resource is active, and
wherein the secondary receiver function has a lower power consumption than the receiver function.

5. A method, comprising:
receiving, when a device is in inactive mode, a wake-up signal on a secondary frequency resource independently from scheduling of a scheduled system;
receiving an information about the secondary frequency resource in a system information message or via a dedicated signaling; and
controlling reception of scheduled frequency resources based on the received wake-up signal,
wherein the wake-up signal is received in a dedicated carrier of the secondary frequency resource in selected transmission time intervals,
wherein in the inactive mode, a receiver function configured to receive scheduled frequency resources is inactive, and a secondary receiver function configured to receive the secondary frequency resource is active,
wherein the secondary receiver function has a lower power consumption than the receiver function,
wherein the scheduled frequency resources comprise at least one unit of resource, the unit of resource comprising a first frequency resource, and
wherein the wake-up signal activates the device in inactive mode.

6. A method according to claim 5, comprising controlling, based on the wake-up signal, the receiver function operating with a wider bandwidth or based on a different radio access technology than the secondary receiver function configured to receive the secondary frequency resource, when the receiver function is in inactive mode.

7. A method according to claim 5, wherein the secondary frequency resource comprises a second frequency resource that is smaller than the first frequency resource in one unit of resource.

8. An apparatus, comprising at least one processor, and at least one memory including computer program code, wherein the at least one memory and the computer program code are configured, with the at least one processor, to cause the apparatus to at least:
allocate, to at least one device in inactive mode, a secondary frequency resource independently from scheduling of a scheduled system;

transmit a wake-up signal, to the at least one device in inactive mode, on the secondary frequency resource to control reception of scheduled frequency resources; and transmit an information about the secondary frequency resource in a system information message or via a dedicated signaling, wherein the wake-up signal is transmitted in a dedicated carrier of the secondary frequency resource in selected transmission time intervals, wherein the scheduled frequency resources comprise at least one unit of resource, the unit of resource comprising a first frequency resource, and wherein the wake-up signal activates the at least one device in inactive mode.

9. An apparatus according to claim 8, wherein the at least one memory and the computer program code are configured, with the at least one processor, to cause the apparatus to control, based on the wake-up signal, a receiver function operating with a wider bandwidth or based on a different radio access technology than a secondary receiver function configured to receive the secondary frequency resource, when the first receiver function is in inactive mode.

10. An apparatus according to claim 8, wherein the secondary frequency resource comprises a second frequency resource that is smaller than the first frequency resource in one unit of resource.

11. An apparatus according to claim 8, wherein the at least one memory and the computer program code are configured, with the at least one processor, to communicate information about the secondary resource, and the information preferably comprises at least one of: user equipment identification or paging information.

12. An apparatus according to claim 8, wherein
the secondary frequency resources comprise at least one sub-carrier of an orthogonal frequency division multiplexing (OFDM) system, and/or
the secondary frequency resource is at least in part included in a scheduled frequency resource, and/or
the secondary frequency resource comprises a direct current sub-carrier of an OFDM system.

13. An apparatus according to claim 8, wherein the wake-up signal on the secondary resource wakes up a function for receiving scheduled resources.

14. An apparatus according to claim 8,
wherein in the inactive mode, a receiver function configured to receive scheduled frequency resources is inactive, and a secondary receiver function configured to receive the secondary frequency resource is active, and
wherein the secondary receiver function has a lower power consumption than the receiver function.

15. An apparatus comprising: at least one processor, and at least one memory including computer program code, wherein the at least one memory and the computer program code are configured, with the at least one processor, to cause the apparatus to at least:

receive scheduled frequency resources of a scheduled system, receive, when the apparatus is in inactive mode, a wake-up signal on a secondary frequency resource independently from scheduling of the scheduled system, receive an information about the secondary frequency resource in a system information message or via a dedicated signaling, and control reception of the scheduled frequency resources based on the signal, wherein the wake-up signal is received in a dedicated carrier of the secondary frequency response in selected transmission time intervals, wherein in the inactive mode, a receiver function configured to receive scheduled frequency resources is inactive, and a secondary receiver function configured to receive the secondary frequency resource is active, wherein the secondary receiver function has a lower power consumption than the receiver function, wherein the scheduled frequency resources comprise at least one unit of resource, the unit of resource comprising a first frequency resource, and wherein the wake-up signal activates the apparatus in inactive mode.

16. An apparatus according to claim 15, wherein the at least one memory and the computer program code are configured, with the at least one processor, to cause the apparatus to control, based on the wake-up signal, the receiver function operating with a wider bandwidth or based on a different radio access technology than the secondary receiver function configured to receive the secondary frequency resource, when the first receiver function is in inactive mode.

17. An apparatus according to claim 15, wherein the secondary frequency resource comprises a second frequency resource that is smaller than the first frequency resource in one unit of resource.

18. An apparatus according to claim 15, wherein the at least one memory and the computer program code are configured, with the at least one processor, to communicate information about the secondary resource, wherein the information preferably comprises at least one of: user equipment identification or paging information.

19. An apparatus according to claim 15, wherein
the secondary frequency resources comprise at least one sub-carrier of an orthogonal frequency division multiplexing (OFDM) system, and/or
the secondary frequency resource is at least in part included in a scheduled frequency resource, and/or
the secondary frequency resource comprises a direct current sub-carrier of an OFDM system.

20. An apparatus according to claim 15, wherein the wake-up signal on the secondary resource wakes up a function for receiving scheduled resources.

* * * * *

UNITED STATES PATENT AND TRADEMARK OFFICE
CERTIFICATE OF CORRECTION

PATENT NO. : 10,616,890 B2
APPLICATION NO. : 15/126694
DATED : April 7, 2020
INVENTOR(S) : Frank Frederiksen et al.

It is certified that error appears in the above-identified patent and that said Letters Patent is hereby corrected as shown below:

In the Claims

Claim 15, Column 14, Line 12:
Please change "secondary frequency response" to --secondary frequency resource--

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*